United States Patent
Han et al.

(10) Patent No.: US 6,741,026 B2
(45) Date of Patent: May 25, 2004

(54) FIELD EMISSION DISPLAY INCLUDING CARBON NANOTUBE FILM AND METHOD FOR FABRICATING THE SAME

(75) Inventors: Si Wook Han, Kyongsangbuk-do (KR); Sang Mun Kim, Kyongsangbuk-do (KR)

(73) Assignee: LG Electronics Inc., Seoul (KR)

( * ) Notice: Subject to any disclaimer, the term of this patent is extended or adjusted under 35 U.S.C. 154(b) by 427 days.

(21) Appl. No.: 09/733,952

(22) Filed: Dec. 12, 2000

(65) Prior Publication Data

US 2001/0004979 A1 Jun. 28, 2001

(30) Foreign Application Priority Data

Dec. 14, 1999 (KR) .............................. 99/57590

(51) Int. Cl.[7] .................................. H01J 1/62
(52) U.S. Cl. ...................... 313/495; 313/310
(58) Field of Search ................. 313/495–497, 313/309, 310, 336, 351; 445/24, 25, 50, 51

(56) References Cited

U.S. PATENT DOCUMENTS 5,214,347 A * 5/1993 Gray ........................ 313/309
6,100,628 A * 8/2000 Coll et al. .................. 313/310
6,445,124 B1 * 9/2002 Asai et al. .................. 313/495
6,489,710 B1 * 12/2002 Okita et al. ................. 313/309

FOREIGN PATENT DOCUMENTS

JP          359190230 A  * 10/1984
JP          10072240 A   *  3/1998

* cited by examiner

Primary Examiner—Ashok Patel
Assistant Examiner—Joseph Williams
(74) Attorney, Agent, or Firm—Fleshner & Kim, LLP

(57) ABSTRACT

Field emission display and method for fabricating the same, the field emission display including a cathode array having a cathode electrode formed on a substrate, insulating layers and carbon nanotube films for use as emitter electrodes formed alternately on the cathode electrode, and a gate electrode formed on the insulating layer, thereby permitting fabrication of a large sized cathode plate at a low cost because the film is formed by screen printing and exposure, which can reduce the cumbersome steps in fabrication of the related art Spindt emitter tip, and both a low voltage and a high voltage FEDs because the carbon nanotube film used as the emitter has a low work function, with an easy and stable electron emission capability.

22 Claims, 5 Drawing Sheets

FIELD EMISSION DISPLAY INCLUDING CARBON NANOTUBE FILM AND METHOD FOR FABRICATING THE SAME

BACKGROUND OF THE INVENTION

1. Field of the Invention

The present invention relates to a field emission display, and more particularly, to a field emission display which has a stable driving voltage and an excellent productivity, and a method for fabricating the same.

2. Background of the Related Art

Referring to FIG. 1, a related art Spindt type FED(Field Emission Display) is provided with an anode part 10, a cathode part 20, and a spacer 9 connected between the anode part and the cathode part. The anode part 10 has a face plate 1 which is a glass substrate, an anode 2 which is an ITO (Indium Tin Oxide) thin film electrode formed thereon, and R, G, B stripes 8 of fluorescent materials coated thereon. The cathode part 20 has a base plate 3 of a nonconductive material, an orthogonal matrix of cathode electrode 4 rows and gate electrode 5 columns, FEA(Field Emission Array) emitters 6 matrix addressed between adjacent row electrode and column electrode for emission of electrodes, and an approx. 1 μm thick insulator 7 between adjacent emitters. The spacer 9 is inserted between the anode part 10 and the cathode part 20, to maintain a 20~400 μm gap between the face plate 1 and the base plate 3, with the two plates sealed with frit glass to maintain a cavity formed thereby to be $10^{-7}$ torr. The cathode electrode 4, the row electrode of the cathode part 20, is negative electrode, and for stable operation by reducing current from the emitter 6, electrons from 1000~10000 the emitters are designed to be directed toward one pixel formed on a screen of the face plate.

The related art FED display forms an image as an electric field is provided to the cathode electrode 4, to boost a voltage on the gate electrode 5, that causes the emitter 6 to emit electrons, which are accelerated toward the anode 2 until the electrons hit onto the fluorescent surface 8 on the anode 2 that causes the fluorescent surface emits light, to form the image. If an intense field are provided to a surface of a metal and the like having a work function, which makes a potential barrier thinner, electrons overcome the barrier and are emitted out of the surface(tunneling). The more intense the field become, the thinner the potential barrier become, for easier emission of the electron. And, in order to maximize the field under the same voltage, a structure with a sharp end, such as a tip, is formed. Accordingly, the Spindt type emitters are used in the related art. The Spindt type emitters are disclosed in Japanese Patent Publications H10-12166, H11-111160, H10-69867.

In the meantime, according to Fowler-Nordheim theory, an emission current is heavily dependent on a work function of an emissive substance, wherein Fowler and Nordheim found an equation for calculating a current density 'J' which can be obtained when a field emission is occurred by application of a field to the substance in 1928. This is a calculation of a flow of electrons (current) emitted from a free electron metal with a work function φ, which has a step barrier on a surface thereof and is applied of an electric field. The above theory can be expressed as the following equations (1) and (2).

$$J = \frac{A\beta^2 V^2}{\Phi} \mathrm{Exp}-\left(\frac{B\Phi^{\frac{3}{2}}}{\beta v}\right) \quad (1)$$

$$\mathrm{Ln}\left(\frac{I}{V^2}\right) = \mathrm{Ln}(a) - \left(\frac{b}{V}\right) \quad (2)$$

where, J denotes an emission current density A/cm², V denotes an electric field applied to a metal surface V/cm, φ= work function of a metal eV, A, and B denote constants, β denotes an electric field multiplication coefficient: an electrode gap, Tip sharpness. A graph drawn taking 1/V as an X-axis and ln(1/v2) as a Y-axis in the equation (1) is called as a Fowler-Nordheim Plot(or FN plot), which is an important method for determining characteristics of field emission electrons. A straight portion of the graph with a negative slop is a current region caused by the field emission.

According to the equation (2), the work function is required to be small for effective electron emission. However, with the work function between 4~5, the Spindt tip emitter requires much energy for the electron emission. And, in fabrication of the FED, because an E-beam is used, screen size can not be any larger than 20″, fabrication of the FED takes much time, and product cost is high.

SUMMARY OF THE INVENTION

Accordingly, the present invention is directed to a field emission display and a method for fabricating the same that substantially obviates one or more of the problems due to limitations and disadvantages of the related art.

An object of the present invention is to provide a field emission display and a method for fabricating the same, which is suitable to form a large sized display with easy.

Another object of the present invention is to provide a field emission display and a method for fabricating the same, which makes a driving voltage stable, has a uniform field emission characteristic, low cost, and an excellent productivity.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the field emission display including a cathode array having a cathode electrode formed on a substrate, insulating layers and carbon nanotube films for use as emitter electrodes formed alternately on the cathode electrode, and a gate electrode formed on the insulating layer.

In another aspect of the present invention, there is provided a method for fabricating a field emission display, including the steps of (1) forming a cathode electrode, an insulating layer, and a gate electrode on a substrate in succession, (2) etching the gate electrode and the insulating layer into a cathode array pattern, to form an emitter region, (3) forming a sacrificial layer on the gate electrode which is not etched, (4) depositing a carbon nanotube film on the cathode electrode in the emitter region, to form an emitter, and (5) etching the sacrificial layer for removing the carbon nanotube formed on the sacrificial layer, to form a cathode array.

In further aspect of the present invention, there is provided a method for fabricating a field emission display, including the steps of (1) forming a cathode electrode, an insulating layer, a gate electrode, and a sacrificial layer on a substrate in succession, (2) etching the sacrificial layer, the gate electrode, and the insulating layer into a cathode array pattern, to form an emitter region, (3) forming a carbon nanotube film as an emitter on the cathode electrode in an etched emitter region, and (4) etching the sacrificial layer not etched in the step (2) for removing the carbon nanotube formed on the sacrificial layer, to form a cathode array.

Thus, the present invention can fabricate a large sized cathode plate at a low cost because the film is formed by screen printing and exposure, which can reduce the cumbersome steps in fabrication of the related art Spindt emitter tip. And, as the carbon nanotube film used as the emitter has a low work function, with an easy and stable electron emission capability, both a low voltage and a high voltage FED can be made available.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
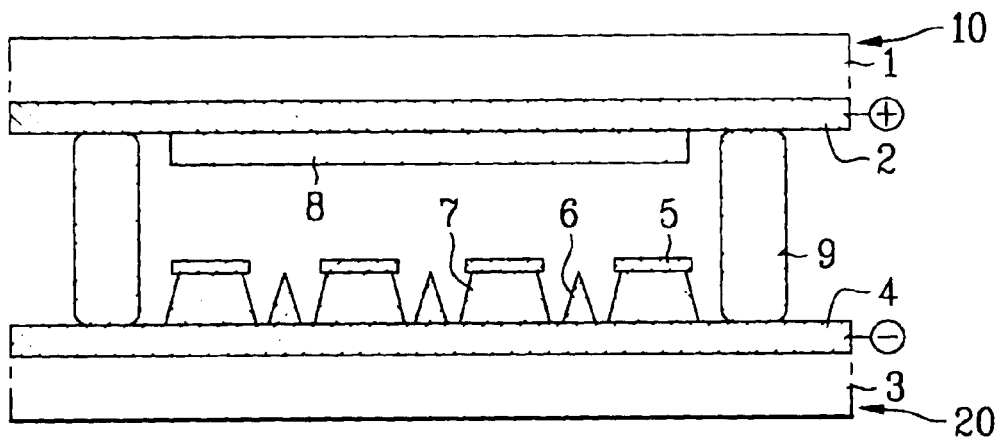
FIG. 1 illustrates a related art field emission display, schematically.

The present invention relates to a field emission display including a cathode array each with a cathode electrode 12 on a substrate 11, an insulating layer 13, a gate electrode 14, and a carbon nanotube film 16 as an emitter, and a method for fabricating the same. Reference will now be made in detail to the preferred embodiments of the present invention, examples of which are illustrated in the accompanying drawings.

EMBODIMENT 1

FIGS. 2A~2F illustrate sections showing the steps of a process for fabricating a cathode array of a field emission display in accordance with a first preferred embodiment of the present invention.

First, the substrate 11 is cleaned by using supersonic wave with a super clean water, acetone, alcohol, and then hot air is blown to the substrate 11 while the substrate 11 is rotated on a spin coater using a centrifugal force. Then, a silicon oxide film is deposited on the cleaned substrate as a buffer layer by PECVD(Plasma Enhanced Chemical Vapor Deposition) at $10^{-1} \sim 10^{-7}$ torr and a temperature ranging 30~400° C. to 2000~2500 Å. In a case of a glass substrate which requires no insulating film, the buffer layer may not be formed.

Figure 2A:
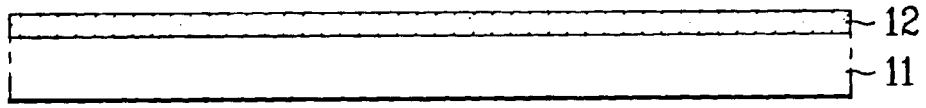
FIGS. 2A~2F illustrate sections showing the steps of a process for fabricating a cathode array of a field emission display in accordance with a first preferred embodiment of the present invention.

Referring to FIG. 2A, an electrode film is formed on the glass substrate 11 as the cathode electrode 12. The electrode film is formed of Ni, Cr, Mo, Fe—Ni alloy, Co, Cu, or an alloy of them, by sputtering, thermal deposition, chemical vapor deposition(CVD), e-beam deposition, and a vacuum deposition in which a metal sol solution is spin coated and heat treated. The deposition is carried out at a vacuum ranging $10^{-3}$ torr~$10^{-7}$ torr, at a substrate temperature ranging 30~500° C., and to an electrode thickness ranging 2000~2500 Å.

Figure 2B:
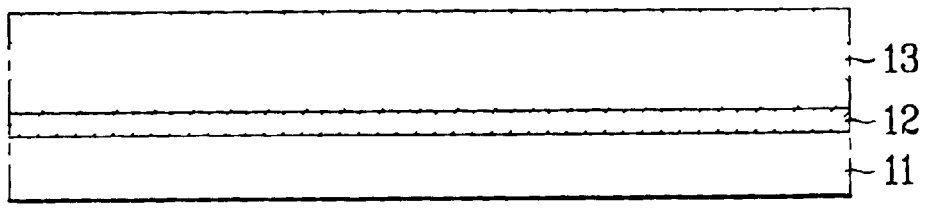

Then, referring to FIG. 2B, a glass paste containing photoresist is screen printed on the cathode electrode 12, patterned by exposure and development, and heat treated in a furnace with a mixture atmosphere of at least one of nitrogen, argon, and hydrogen, or in a vacuum chamber, to form an insulating film 13 to a thickness of 0.5~50 µm.

Figure 2C:
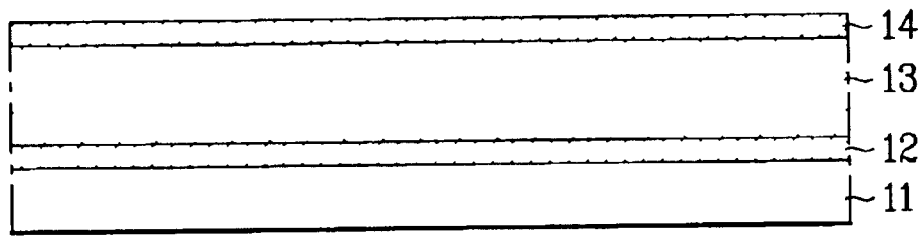

Then, referring to FIG. 2C, a metal sol solution with a grain size ranging 10~200 Å containing photoresist is coated on the insulating film 13, and exposed and developed to for a film, and heat treated at a temperature ranging 200~500° C. in a furnace with a mixture atmosphere of at least one of nitrogen, and argon, or in a vacuum chamber, to form a gate 14 electrode film at least one of Cr, Ni, Mo, Cu, Pt, Ag to a thickness of 1000~10000 Å.

Figure 2D:
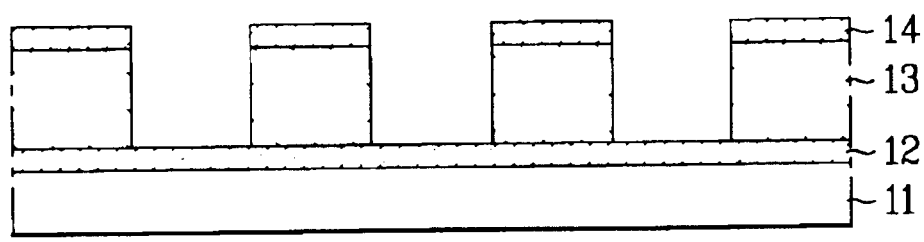
Figure 3A:
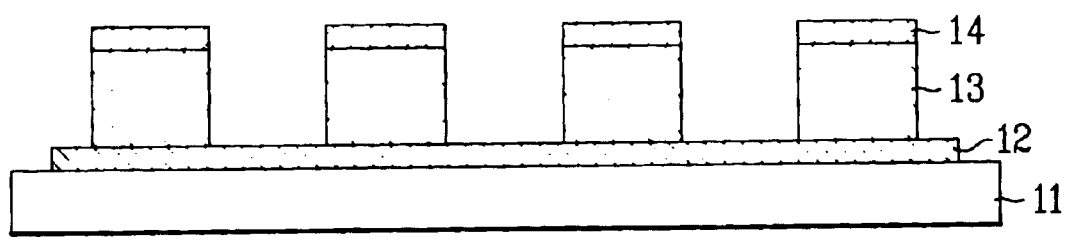
FIGS. 3A~3B illustrate sections of cathodes of a field emission display of the present invention; and, FIGS. 4A~4E illustrate sections showing the steps of a process for fabricating a cathode array of a field emission display in accordance with a second preferred embodiment of the present invention.
Figure 3B:
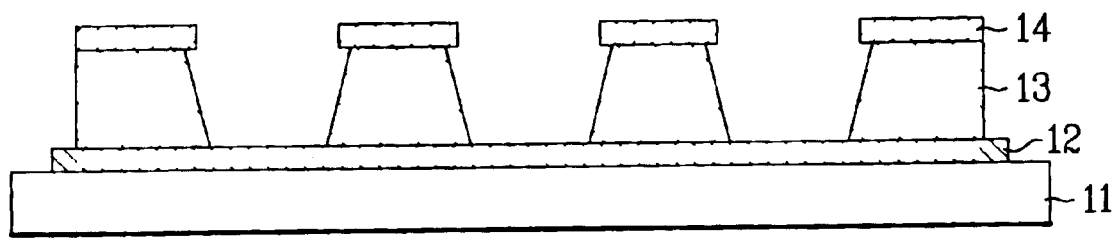

Then, referring to FIG. 2D, the gate 14 electrode is patterned and etched, the insulating film in emitter regions only are etched, leaving the insulating film under the gate electrode. In this instance, as shown in FIG. 3A, the gate and the insulating film in the emitter regions may be etched vertically by dry etching, or as shown in FIG. 3B, portions of the insulating film under the gate electrode in the vicinity of an edge of the gate electrode may be etched further by wet etching.

Figure 2E:
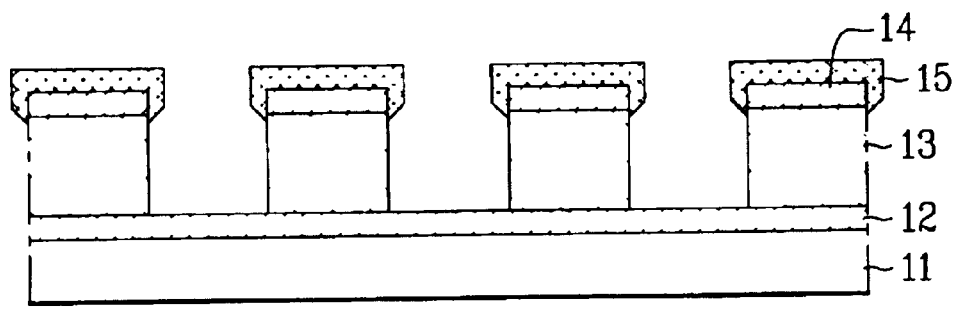
Figure 2F:
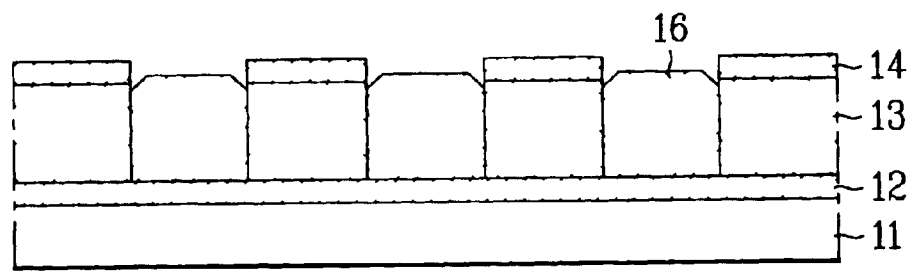

Then, referring to FIG. 2E, an Al layer is deposited by tilting the E-beam, and exposed and developed, to form a sacrificial layer 15, and as shown in FIG. 2F, a carbon nanotube 16 is grown on the cathode electrode by MPCVD (Microwave Plasma Chemical Vapor Deposition) by using microwave, at a substrate temperature ranging 400~800° C., $1 \times 10^{-2}$~100 torr vacuum, for 5 to 15 minutes deposition, in a mixture vaporization gas of argon or methane, by using 2~5 GHz microwave, to a thickness of 0.5~50 µm. The Al film deposited as a sacrificial layer 15 is etched to remove the carbon nanotube on the Al layer, to leave the carbon nanotube 16 film only in the emitter regions on the cathode electrode 12.

Thus, a field emission display with a cathode array having a carbon nanotube film 16 as an emitter, an insulating film 13 and the gate 14 can be fabricated.

Thus, the present invention can fabricate a large sized cathode plate at a low cost because the film is formed by screen printing and exposure, which can reduce the cumbersome steps in fabrication of the related art Spindt emitter tip. And, as the carbon nanotube film used as the emitter has a low work function, with an easy and stable electron emission capability, both a low voltage and a high voltage FED can be made available.

Then, frit binder is coated on the anode substrate having the fluorescent material coated thereon, the spacer is attached thereto, and the cathode part having the carbon nanotube formed thereon is attached thereto, bonded, sealed in vacuum, and evacuated, to complete fabrication of the field emission display.

EMBODIMENT 2

The second embodiment has process conditions, such as a deposition temperature, vacuum, a time period required for the deposition, the same with the first embodiment, except that the process for forming the emitter region for forming the carbon nanotube as the emitter. That is, different from the first embodiment, in which the sacrificial layer is formed after the gate electrode and the insulating layer are etched, to form the emitter region, the second embodiment shows formation of the emitter region after formation of the sacrificial layer, the gate electrode, and the insulating layer, which will be described in detail. FIGS. 4A~4E illustrate sections showing the steps of a process for fabricating a cathode array of a field emission display in accordance with a second preferred embodiment of the present invention.

Figure 4A:
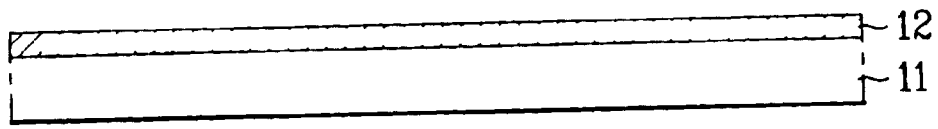
Figure 4B:
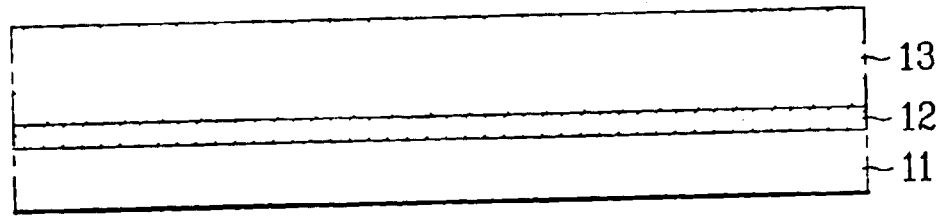
Figure 4C:
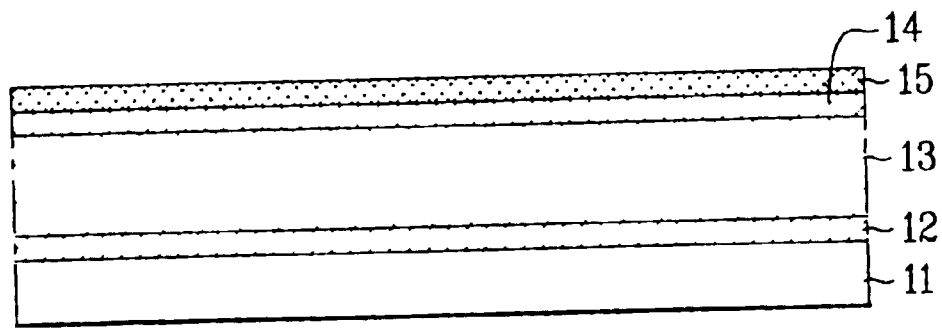
Figure 4D:
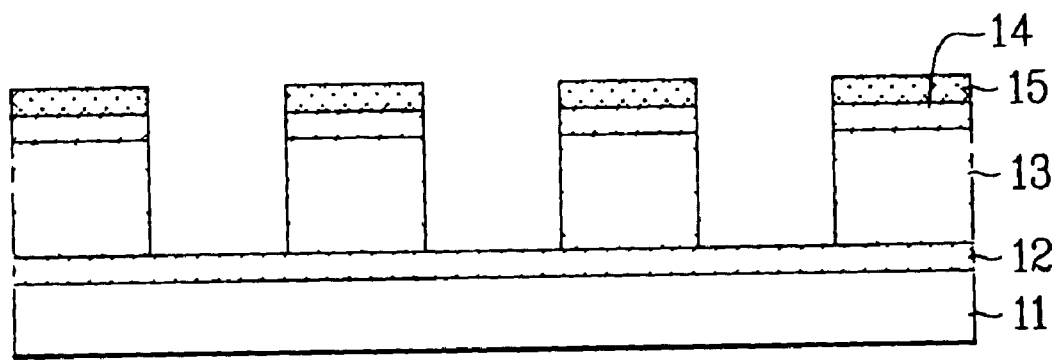
Figure 4E:
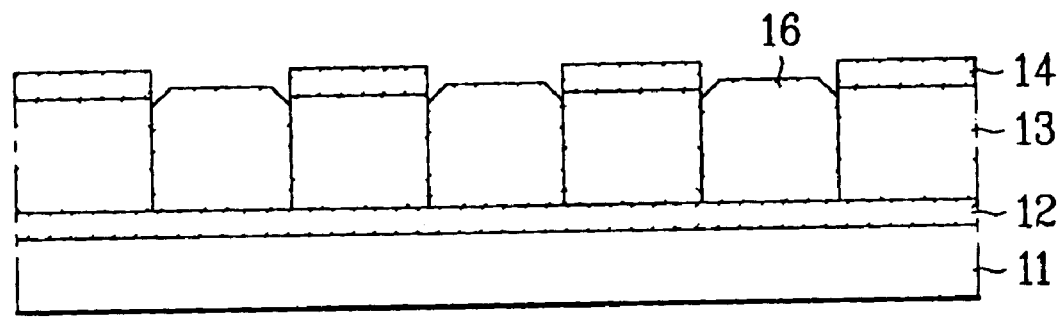

Referring to FIG. 4A, an electrode film is formed on a substrate 11 as a cathode electrode 12. As shown in FIG. 4B, a glass paste containing photoresist is screen printed on the cathode electrode 12, patterned by exposure, and development, heat treated in a furnace in an atmosphere of at least one of nitrogen, argon, and hydrogen, or in a vacuum chamber, to form an insulating film 13. Then, as shown in FIG. 4C, a metal sol solution with a grain size 10~200 Å containing photoresist is coated on the insulating film 13, exposed, developed, and dried, to form a film 14. Then, Al sol solution containing photoresist or paste is coated on the film 14, to form a film 15, and heat treated in a furnace under a mixture atmosphere of at least one of nitrogen, argon, and hydrogen, or in a vacuum chamber, to form a gate electrode 14 and an Al layer as a sacrificial layer 15 on the same time. As shown in FIG. 4D, the sacrificial layer 15, the gate electrode 14, and the insulating film 13 are etched in succession to form an emitter region, and as shown in FIG. 4E, a carbon nanotube film 16 is formed as an emitter. Then, frit binder is coated on an anode substrate having fluorescent material coated thereon, a spacer is attached thereto, the cathode part having the carbon nanotube formed thereon is attached thereto and bonded together, sealed in a vacuum, and evacuated, to complete fabrication of a field emission display.

Since advantages of the field emission display of the second embodiment is the same with the first embodiment, description of the advantages of the second embodiment will be omitted.

It will be apparent to those skilled in the art that various modifications and variations can be made in the field emission display and method for fabricating the same of the present invention without departing from the spirit or scope of the invention. Thus, it is intended that the present invention cover the modifications and variations of this invention provided they come within the scope of the appended claims and their equivalents.

What is claimed is:

1. A field emission display comprising a cathode array, the cathode array including:
    a cathode electrode formed on a substrate;
    an insulating layer and a carbon nanotube film formed on a surface of the cathode electrode; and
    a gate electrode formed on the insulating layer, wherein the gate electrode is a coat of metal sol solution with a 10~200 Å grain size containing photoresist.

2. The field emission display as claimed in claim 1, wherein the insulating layer is a coat of glass paste containing photoresist with a thickness of 0.5–50 µm.

3. The field emission display, as claimed in claim 1, wherein the insulating layer and the carbon nanotube film are formed side-by-side.

4. The field emission display as claimed in claim 1, wherein the gate electrode is formed of at least one of Cr, Ni, Mo, Cu, Pt or Ag.

5. The field emission display as claimed in claim 1, wherein the gate electrode has a film thickness of 1000~10,000 Å.

6. A field emission display with a cathode array, wherein the cathode array comprises:
    a cathode electrode on a substrate;
    an insulating layer on the cathode electrode;
    a carbon nanotube film on the cathode electrode, wherein a side surface of the carbon nanotube film is in contact with at least one side surface of the insulating layer; and
    a gate electrode formed on the insulating layer.

7. The field emission display of claim 6, wherein the carbon nanotube film is in contact with an upper surface of the cathode electrode, wherein the carbon nanotube film has an upper surface parallel to the upper surface of the cathode electrode, and wherein the upper surface of the carbon nanotube film has a width narrower than at least one other width of the carbon nanotube film.

8. The field emission display of claim 6, wherein at least a portion of the carbon nanotube film has a height similar to the gate electrode.

9. The field emission display of claim 6, wherein the insulating layer contacts an upper surface of the cathode electrode, and wherein the insulating layer has a side plane located at about 90 degrees from the upper surface of the cathode electrode.

10. The field emission display of claim 6, wherein the insulating layer contacts an upper surface of the cathode electrode, and wherein the insulating layer has a side plane located at less than 90 degrees from the upper surface of the cathode electrode.

11. The field emission display of claim 1, wherein the carbon nanotube film contacts an upper surface of the cathode electrode, and wherein the carbon nanotube film has a side plane located at about 90 degrees from the upper surface of the cathode electrode.

12. The field emission display of claim 1, wherein the carbon nanotube film contacts an upper surface of the cathode electrode, and wherein the carbon nanotube film has a side plane located at less than 90 degrees from the upper surface of the cathode electrode.

13. The field emission display of claim 1, wherein the gate electrode is a coat of metal sol solution with an approximately 10 to 200 Å grain size containing photoresist.

14. The field emission display of claim 1, wherein the gate electrode is formed of at least one of Cr, Ni, Mo, Cu, Pt or Ag.

15. The field emission display of claim 1, wherein the gate electrode has a film thickness of approximately 1000 to 10,000 Å.

16. A field emission display with a cathode array, wherein the cathode array comprises:
    a cathode electrode on a substrate;
    an insulating layer on the cathode electrode;
    a carbon nanotube film on the cathode electrode, wherein the carbon nanotube film and the insulating layer along a surface of the cathode electrode; and
    a gate electrode formed on the insulating layer, wherein at least a portion of the carbon nanotube film has a height similar to the gate electrode.

17. The field emission display of claim 16, wherein the carbon nanotube film is in contact with an upper surface of the cathode electrode, wherein the carbon nanotube film has an upper surface parallel to the upper surface of the cathode electrode, and wherein the upper surface of the carbon nanotube film has a width narrower than at least one other width of the carbon nanotube film.

18. The field emission display of claim 16, wherein the insulating layer contacts an upper surface of the cathode electrode, and wherein the insulating layer has a side plane located at about 90 degrees from the upper surface of the cathode electrode.

19. The field emission display of claim 16, wherein the insulating layer contacts an upper surface of the cathode electrode, and wherein the insulating layer has a side plane located at less than 90 degrees from the upper surface of the cathode electrode.

20. The field emission display of claim 16, wherein the gate electrode is a coat of metal sol solution with an approximately 10 to 200 Å grain size containing photoresist.

21. The field emission display of claim 16, wherein the gate electrode is formed of at least one of Cr, Ni, Mo, Cu, Pt or Ag.

22. The field emission display of claim 16, wherein the gate electrode has a film thickness of approximately 1000 to 10,000Å.

* * * * *